United States Patent [19]

Stewart

[11] 4,268,395
[45] May 19, 1981

[54] EXTRACTION BY SOLID STABILIZED EMULSIONS

[75] Inventor: Robert D. Stewart, Yorba Linda, Calif.

[73] Assignee: Babcock-Brown Boveri Reaktor GmbH, Mannheim, Fed. Rep. of Germany

[21] Appl. No.: 948,618

[22] Filed: Oct. 4, 1978

[51] Int. Cl.³ .......................................... B01D 11/00
[52] U.S. Cl. ....................................... 210/634; 423/8; 423/139; 423/DIG. 14; 423/658.5; 210/749
[58] Field of Search ............................ 210/21-23 FH, 210/59; 210/21-23 FH, 59; 55/16, 158; 423/8, 24, 54, 63, 70, 112, 139, 157, 181, 658.5, DIG. 14; 252/309

[56] References Cited

U.S. PATENT DOCUMENTS

| | | | |
|---|---|---|---|
| 2,728,633 | 12/1955 | Arden et al. | 423/8 X |
| 3,410,794 | 11/1968 | Li | 210/21 |
| 3,617,546 | 11/1971 | Li | 210/59 |
| 3,779,907 | 12/1973 | Li et al. | 210/37 R |
| 3,959,173 | 5/1976 | Li et al. | 210/21 |
| 4,001,109 | 1/1977 | Li et al. | 210/22 R |
| 4,014,785 | 3/1977 | Li et al. | 210/22 |
| 4,014,785 | 3/1977 | Li et al. | 210/21 |
| 4,086,163 | 4/1978 | Cahn et al. | 210/22 |

FOREIGN PATENT DOCUMENTS 638759  3/1962  Canada ................................ 210/21

Primary Examiner—Charles N. Hart
Assistant Examiner—E. Rollins Cross
Attorney, Agent, or Firm—D. Anthony Gregory; Robert J. Edwards

[57] ABSTRACT

A process for transfer by extraction, of at least one species from a fluid phase to a first liquid phase receptive to such species, comprises intimately contacting the fluid phase with an emulsion of the first liquid phase in a second liquid phase which is permeable with respect to such species and substantially immiscible in the first liquid phase. The emulsion is stabilized by the second liquid phase containing at least one substantially insoluble particulate solid which is substantially non-reactive to constituents contained in each of such phases in an amount sufficient to form a stable emulsion. Transfer of the species is from the fluid phase through the second solids-containing liquid phase to the first liquid phase.

In one embodiment, the first liquid phase is lean with respect to the species to be extracted. In another embodiment, mass action is utilized to maintain a driving force by counter-transport of a different ion.

Where all phases are liquid, one phase is regarded as the bulk phase and the first liquid phase termed the internal phase is contained in a surrounding membrane of the solids-containing second liquid phase or the external phase. Transfer may be from the bulk to the first liquid phase or vice versa. The bulk and internal phases are normally aqueous in nature.

15 Claims, 13 Drawing Figures

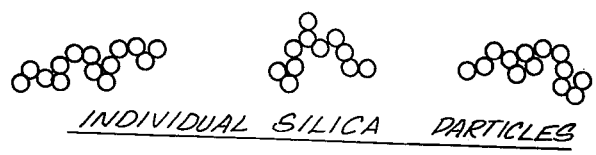
INDIVIDUAL SILICA PARTICLES
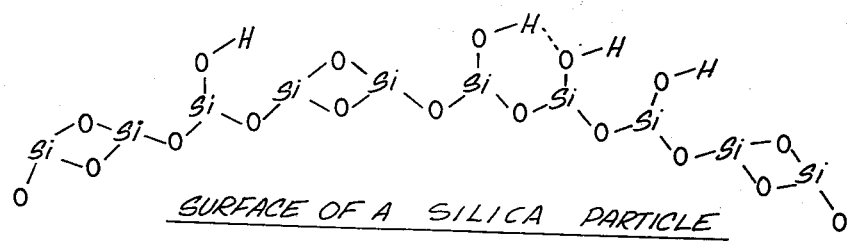
SURFACE OF A SILICA PARTICLE
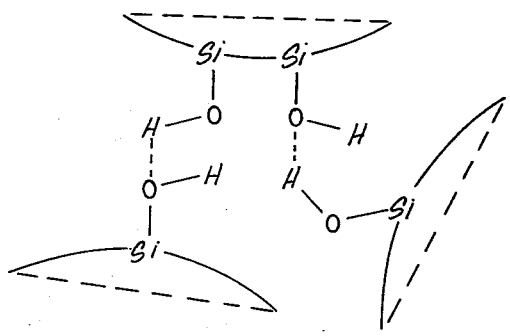
LINKING OF SILICA PARTICLES BY HYDROGEN BONDING
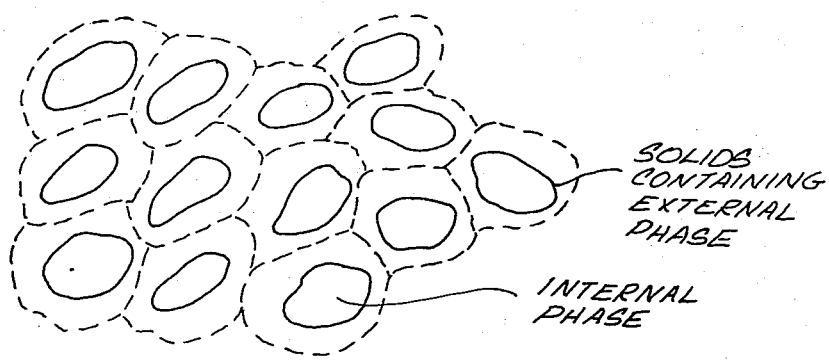
EMULSION STABILIED BY SILICA NETWORK
Fig. 1

Fig. 2
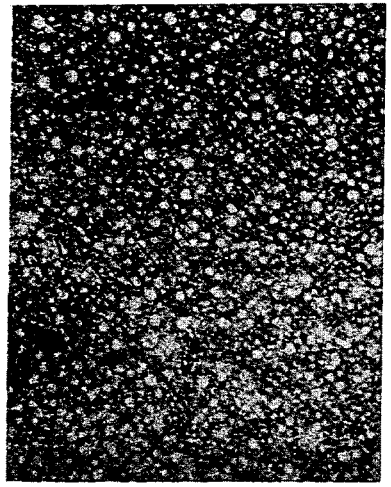
Fig. 3

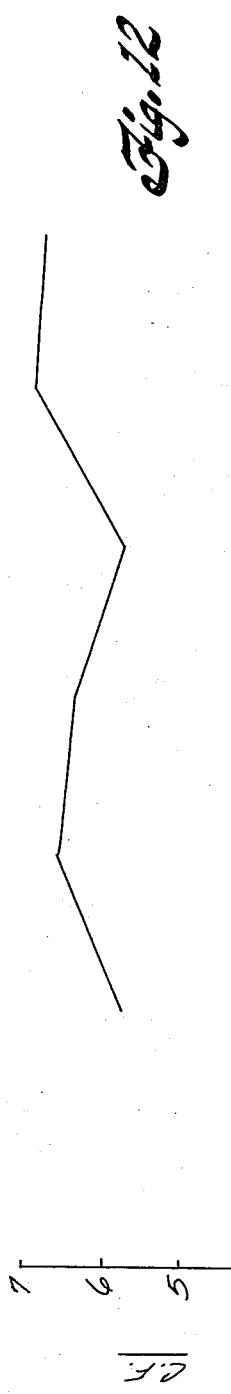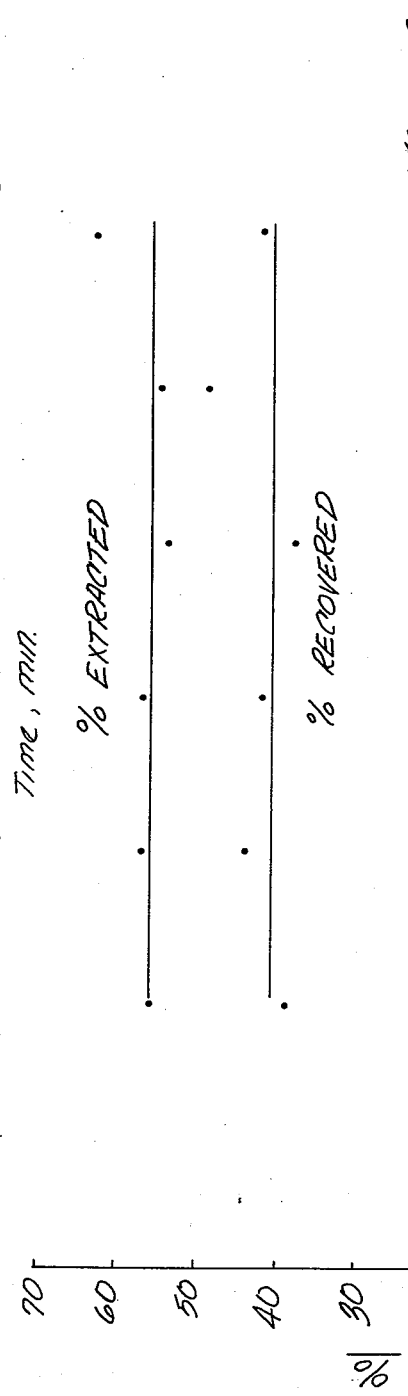

EXTRACTION BY SOLID STABILIZED EMULSIONS

BACKGROUND OF THE INVENTION

A classical method of extracting one or more species from a solution has been the use of a solid membrane which is selectively permeable with respect to such species. A solution containing the species is on one side of the membrane and a solution lean with respect to such species on the other. The species diffuse through the membrane by osmosis and the like until the species present in the solutions on the two sides of the membrane reach equilibrium.

Liquid-liquid extraction works on substantially the same principle, but is more flexible. A liquid phase, which is immiscible in another liquid phase from which extraction is to occur (bulk phase), and which contains a material selective towards the species to be extracted is agitated in the bulk phase as a dispersed phase. After a period of contact, the two phases are allowed to separate and the liquid phase containing the extracted species is removed and stripped of the extracted species for recycle.

In the usual operation, a plurality of extraction cells are employed in series with the extractant solution flowing countercurrent to the solution to be operated on, the bulk phase.

There has emerged a new field of technology involving liquid membrane extraction. Broadly, the principle involves surrounding either a liquid phase from which a species is to be extracted or a liquid phase in which species is to be collected by a liquid membrane which is mutually immiscible in the two. The surrounded liquid phase is called the internal phase, the liquid membrane is called the external phase and the internal phase surrounded by the external phase is contacted with a fluid, liquid or gas, from which extraction is to occur. If liquid, the external phase is immiscible in the liquid.

The liquid phase containing the species to be removed, whether the internal or bulk phase, gives up the species to be extracted to the external phase from which it diffuses to the other liquid phase (which is the stripping phase). In the more sophisticated system, the species enters a lean phase and is converted such that the stripping liquid phase remains lean with respect to the extracted species to promote diffusion or species transport and enable higher levels of extraction to occur.

Thus, the liquid membrane (or the organic continuous portion of the emulsion) serves as an intermediary acting in the same way as an immiscible liquid in liquid-liquid extraction, except that it is constantly stripped of the species which it extracts by the liquid stripping phase.

Illustrative of the patents which have issued in the field of development and application of liquid membrane technology include U.S. Pat. Nos. 3,389,078; 3,410,794, 3,454,389; 3,617,546; 3,637,488; 3,650,091; 3,696,028; 3,719,590; 3,733,776; 3,740,315; 3,740,329; 3,779,907, 3,897,308; 3,942,527 and 3,969,265 and reissues thereof, each incorporated herein by reference. In each, Norman Li is named inventor or coinventor.

Of such patents, a patent of particular interest is U.S. Pat. No. 3,779,907. The invention related to a process for removal of the dissolved species from aqueous solutions (bulk phase) which comprises contacting the bulk phase with an emulsion, the emulsion being characterized by having an external phase which is immiscible in the bulk phase and the internal phase, yet permeable to certain dissolved species. The internal phase contains a reactant capable of converting the extracted dissolved species to a non-permeable form. The liquid membrane (external phase) in addition to including an extractant for the species contained in the bulk liquid phase is stabilized by a liquid or liquefied anionic, cationic, or nonionic surfactant.

Systems in which the liquid membrane contains a surfactant in liquid form have, on investigation, exhibited a low rate of extraction and the surfactant is subject to attack by reagents contained in the liquid membrane, the internal stripping phase and/or the bulk phase. This results in leakage of fluid through the liquid membrane with the consequence of partial or total collapse of the emulsion.

SUMMARY OF THE INVENTION

According to the present invention, there is provided an extraction process for transfer of at least one species from a fluid phase to a first liquid phase receptive to such species which comprises intimately contacting the fluid phase with an emulsion of the first liquid phase in a second liquid phase which is permeable per se, (or is made permeable by the presence of a contained extractant for the species) with respect to such species and substantially immiscible in the first liquid phase and containing at least one substantially insoluble particulate solid which is substantially nonreactive to constituents contained in each of such phases and present in an amount sufficient to form a stable emulsion of the first liquid phase in the second liquid phase for a time sufficient to transfer such species to the second particulate solids-containing liquid phase of such emulsion and then by diffusion or otherwise to the first liquid phase. Preferably, the first liquid phase contains a reactant which converts the extracted species to a species which is non-permeable in the second liquid phase.

One embodiment is an extraction process for transfer of at least one species from a fluid phase to a first liquid phase receptive to and lean in respect to such species which comprises intimately contacting the fluid phase with an emulsion of the first liquid phase in a second liquid phase which is permeable with respect to such species and substantially immiscible in the first liquid phase and containing at least one substantially insoluble particulate solid which is substantially non-reactive to constituents contained in each of such phases and present in an amount sufficient to form a stable emulsion of the first liquid phase in the second liquid phase for a time sufficient for transfer of such species to the second particulate solids-containing liquid phase of such emulsion. The transfer species can be converted (as by chemical reaction) in the first liquid phase to a species which is substantially impermeable in the second particulate solids-containing liquid phase. The fluid phase can be a gas phase.

For liquid phase extractions, there is provided the species to be extracted as contained in one liquid phase, internal or bulk and transferred to another liquid phase, bulk or internal, through a liquid membrane or external phase separating the internal phase from the bulk liquid phase which membrane is mutually immiscible in such phases and permeable to the species to be extracted. The external phase contains particulate solids capable of forming an emulsion of the internal phase in the external phase which solids are substantially nonreactive with respect to reagents present. The external phase also preferably contains at least one reagent which enhances transport of species between such phases without breakdown of the emulsion or leakage through the external phase.

In the preferred application, the phase to receive the species is the internal phase, and in the most preferred embodiment the bulk phase and the interior phase are aqueous in nature while the liquid phase portion of the exterior phase is organic in nature.

In carrying out the process of the invention for the liquid-liquid extractions, the emulsion is preferably formed by dispersing the internal phase in the external phase which contains a particulate solid which selectively remains in the external phase in an amount sufficient to form an emulsion then adding the formed emulsion to the bulk phase in which the emulsified droplets will be dispersed. The emulsified droplets are allowed to remain in the bulk phase for a time sufficient for extraction to occur and the emulsion then separated therefrom and broken to separate the internal phase from the external phase.

If the internal phase is the raffinate phase, it is replaced with a material to be extracted and the emulsion reconstituted for return to the system. If the internal phase is the stripping phase, the extracted species are concentrated therein and may be recovered by breaking the emulsion and regenerating the stripping phase which is returned for further use. In such operation, the solids remain substantially unaffected, permitting repeated use.

Preferably, the bulk phase is the impure phase from which species are to be extracted. The external phase in addition to containing the particulate solids includes an extractant for the species contained in the bulk phase. The interior phase may contain a species for conversion of the species extracted by the external phase to another species which will not return to the bulk phase, such that the internal phase remains lean with respect to extracted species to promote diffusion of such species through the external phase to constantly create a driving force for extraction of the species from the bulk phase. Alternatively, mass action can be utilized to maintain a driving force by counter-transport of a different ion (e.g. extracting cupric ion by counter-transport of hydrogen ion).

THE DRAWINGS

FIG. 1 illustrates one mechanism by which an emulsion of the internal phase in the external phase may be stabilized by particulate solids.

FIG. 2 is a smear photomicrograph illustrating an emulsion of an aqueous internal phase (30 ml. of 10 M $H_3PO_4$) in an organic external phase (20 ml of a solution of 30 g/l of mixed mono and dioctylphenyl phosphoric acids in paraffinic oil) stabilized by particulate fumed silica (0.2 g/ 20 ml external phase).

FIG. 3 is a comparison smear photomicrograph of the same magnification as FIG. 2 illustrating the same system where the organic external phase contains a liquid surfactant, (1% by wt. SPAN 80, Sorbitan Monooleate).

FIG. 11 illustrates a uranium extraction curve using the solids stabilized liquid membrane of this invention, (as described in FIG. 9).

FIG. 12 and 13 illustrate the results of a semi-continuous extraction operation as explained in Example 13.

DETAILED DESCRIPTION

Figure 4:
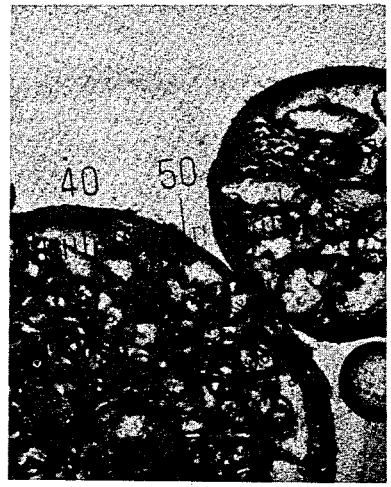
FIG. 4 is a photomicrograph of droplets (dispersed in a bulk phase) of the emulsion of FIG. 2, stabilized by particulate fumed silica.

According to the present invention, there is provided an extraction system for removal of one or more species contained in one fluid phase to another liquid phase. The system consists of a bulk phase, an internal phase and an external phase. The internal phase is surrounded by the external phase which contains at least one particulate solid capable of forming and stabilizing an emulsion of the internal phase in the external phase. The external phase is substantially insoluble in the internal phase and also substantially insoluble in the bulk phase where all phases are liquid. The particulate solids serve to stabilize the emulsion to prevent leakage of extracted constituents of the internal phase through the external phase into the bulk phase or vice versa. The external phase is permeable to the species to be extracted, either by its own nature or through the use of at least one extractant contained in the external phase.

Although the internal phase may be the liquid phase to be purified, i.e. containing species to be diffused through the external phase into the bulk phase, for most applications, the substance to be extracted (which can be an impurity) is contained in the bulk phase and diffused through the external phase into the internal phase. Whichever the arrangement, it is preferred that the extracted species be converted to one different in nature from that in which it existed in the phase from which it was extracted, such that the phase containing it will appear to the external phase lean with respect to the extracted species, to promote takeup by the phase of the species from the other phase. The external phase should be impermeable with respect to the converted form of the extracted species.

Most representative of the systems involved are those in which the internal and bulk phases are aqueous in nature and the external phase is substantially organic in nature and immiscible in the aqueous phases and the emulsion stabilized by the presence therein of particulate solids which are substantially nonreactive with respect to constituents of or contained in the bulk phase, the internal phase or the external phase.

The predicate to carrying out the process of the invention is the formation of an emulsion of the internal phase in the external phase. For extraction from aqueous systems, this would be the formation of a water-in-oil emulsion. For extraction from organic systems, this would be the formation of an oil-in-water emulsion. The ability to transfer the emulsion to a liquid bulk phase with the formation in the bulk phase of discrete droplets of the internal phase surrounded by the solids containing external phase is dependent on the ability of the solids to form the initial emulsion.

The solids which may be used to form the stable emulsions may vary widely, and include, amongst others, fumed silica, organic coated fumed silica such as silane treated fumed silicas, coated and uncoated carbon blacks, coated and uncoated clays, micas and the like.

Figure 10:
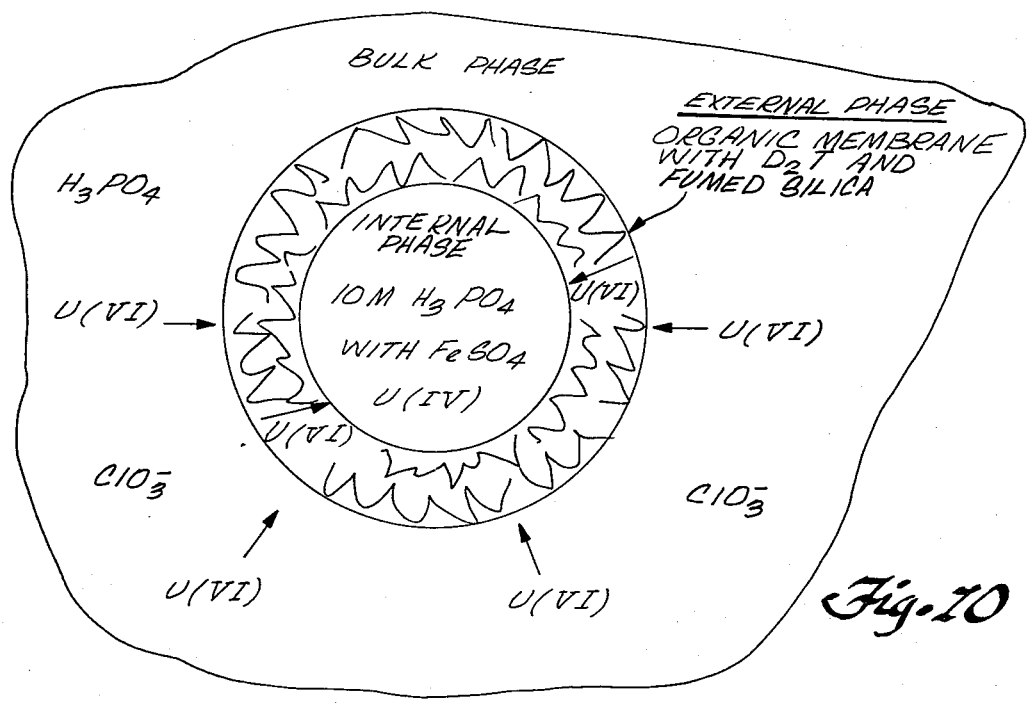
FIG. 10 illustrates another solids-containing liquid membrane extraction system for extracting Uranium VI from an aqueous solution.
Figure 22:
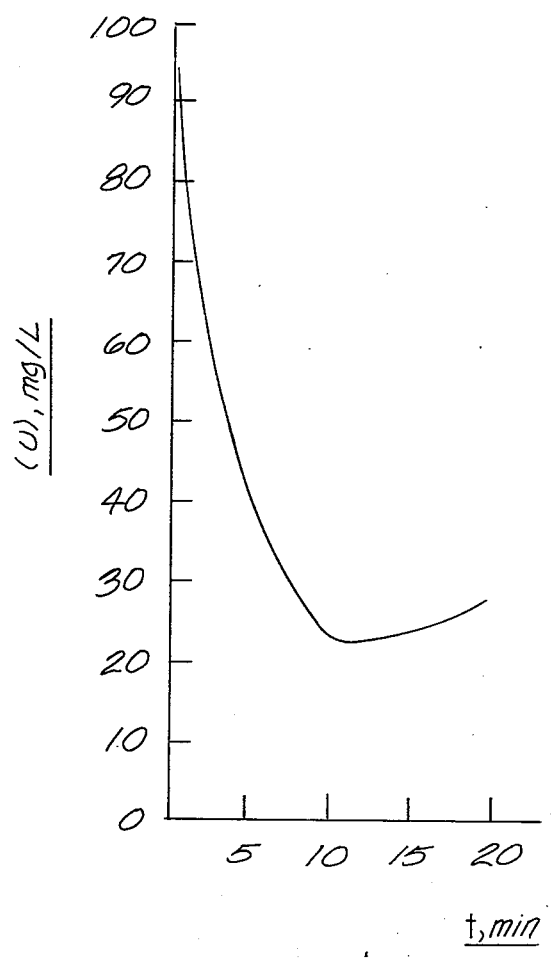

Without being bound by theory, there appear to be two mechanisms by which a stable emulsion is formed. One is by the formation in the external phase of a lattice work of the particles, bonded, for instance, by hydrogen bonds. This mechanism is depicted in FIG. 1 and FIG. 10 and is derived from the teachings of Cabot Corporation as it pertains to the behavior of Cab-O-Sil TM (fumed silica particles).

The difference between a water-in-oil emulsion as formed by particulated fumed silica (e.g. Cab-O-Sil brand from Cabot Corporation) and as compared to a water-in-oil emulsion as formed by a liquid surfactant is shown by the photomicrographs of FIGS. 2 and 3 which are emulsion smears. Both systems are designed for extraction of uranium.

In FIG. 2, the ratio of the aqueous phase to the organic phase is 1.5, the organic phase containing a paraffinic based solvent. The extractant is a mixture of mono- and di-octylphenyphosphoric acids (OPAP). The solid is Cab-O-Sil TM, grade MS-7.

In FIG. 3, by contrast, the same organic phase contains Span 80 (a sorbitan monooleate) where, again, the aqueous to organic ratio if 1.5. The globules formed by the Cab-O-Sil are substantially larger in size than that formed by Span 80 TM. In each instance, magnification of the emulsion smear is 110 times. Each division of the scale shown in the FIGS. is about 17 microns.

FIG. 4 illustrates the emulsion of FIG. 2 contained in an aqueous bulk phase of phosphoric acid in which uranium ion is the impurity, again magnified 110 times.

Another mechanism by which the emulsion can be stabilized is by a balance between the hydrophobic and hydrophillic properties of solids added as the emulsion stabilizer. This mechanism is applicable to carbon black and may be applicable to clays.

Figure 5:
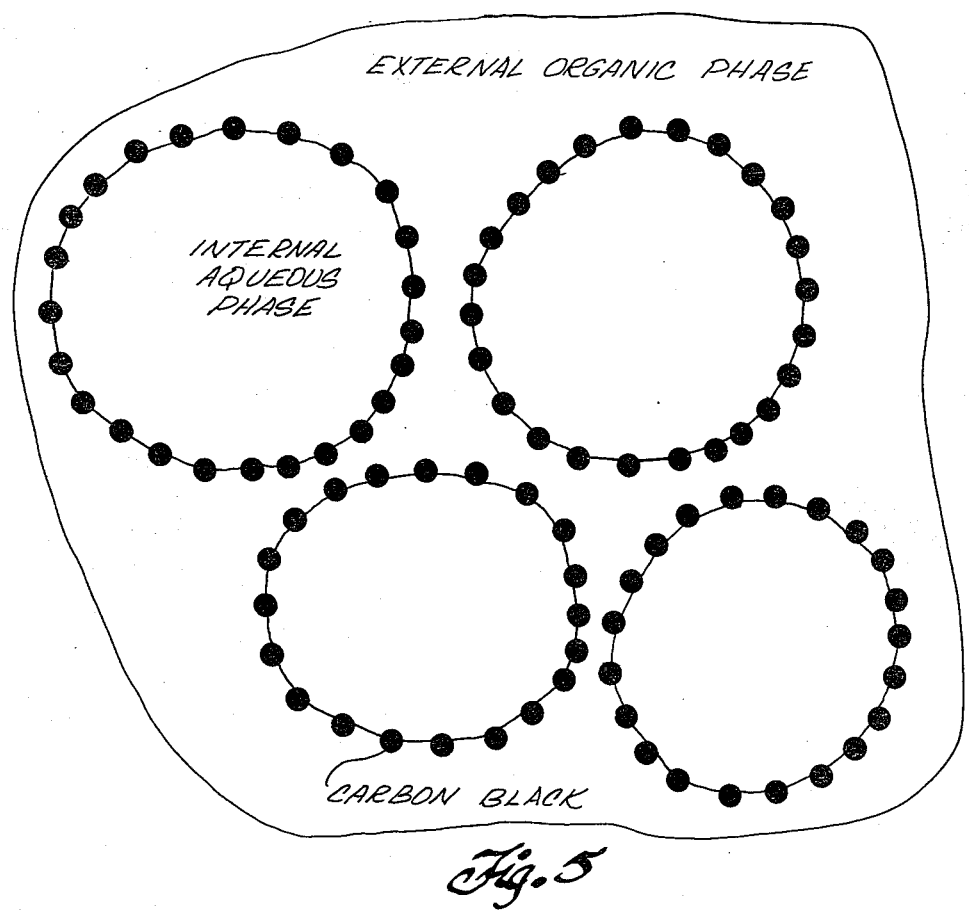
FIG. 5 illustrates another mechanism for particulate solids stabilization of an emulsion of the internal phase in the external phase.

FIG. 5 illustrates the water-in-oil emulsion where the particles of the carbon black gravitate towards the oil-aqueous interface with the higher hydrophobic potential of the carbon black causing the major portion of each particle to remain in the oil phase with some penetration of the particle into the aqueous phase.

For a reverse situation, namely where the internal phase is organic in nature and there is formed an oil-in-water emulsion, then the same mechanism as depicted in FIG. 5 may apply in which the particles which are more hydrophilic remain in the water phase surrounding the internal oil phase and are prevented by their nature from entering the internal phase.

Figure 6:
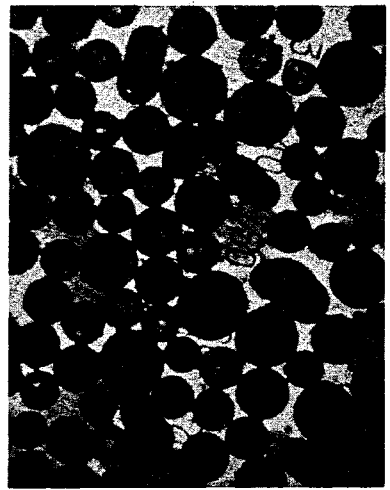
FIG. 6 is a smear photomicrograph illustrative of an emulsion of an internal aqueous phase (20 ml of 10 M $H_3PO_4$) in an external phase (20 ml of Exxon 200 solvent extracted coastal pale oil) stabilized by carbon black (0.2 g/20 ml external phase).

FIG. 6 is a smear photomicrograph illustration of a stabilized emulsion when the ratio of the aqueous to oil phase is one and in which the solids present is carbon black. The internal phase is phosphoric acid.

Figure 7:
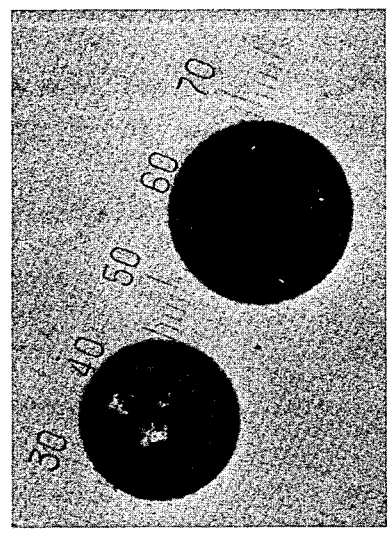
FIG. 7 is a photomicrograph of droplets of the emulsion described in FIG. 6, dispersed in water.

FIG. 7 is a photomicrograph of the droplets of FIG. 6 dispersed in water.

Figure 8:
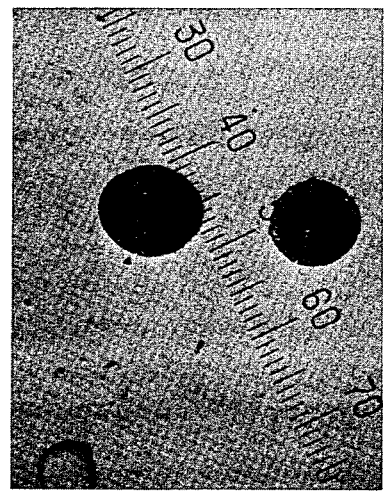
FIG. 8 is a photomicrograph showing the droplets of the emulsion of FIG. 3 dispersed in water.

FIG. 8 by reference is a photomicrograph of the droplets of the emulsion of FIG. 3, in which the external phase contains sorbitan monooleate (Span 80) as the surfactant dispersed in a bulk phase phosphoric acid but magnified 275 times with each division representing approximately 7 microns.

In general, it has been observed, all other factors being equal, that the emulsion formed using the solids as the stabilizer, contains internal phase droplets of larger diameter than those formed with a liquid surfactant, and the internal droplets of the emulsion once dispersed in the bulk phase remain also of larger size.

Figure 9:
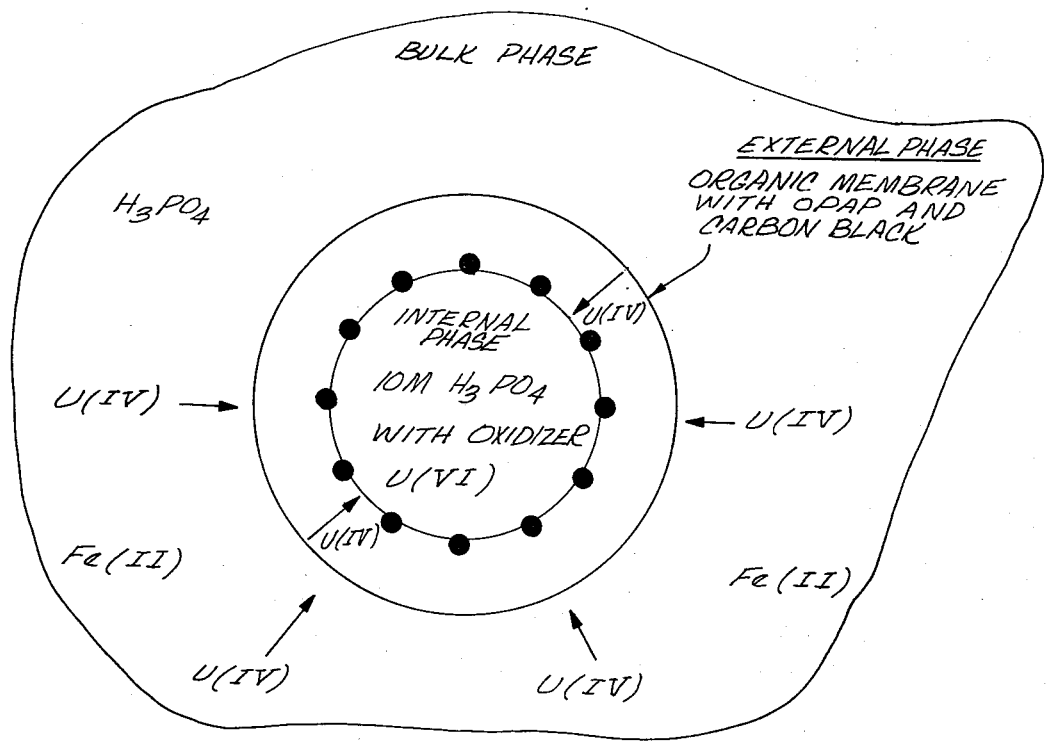
FIG. 9 illustrates a solids-containing membrane extraction system for extracting Uranium IV from an aqueous solution.

FIGS. 9 and 10 depict models of two extraction systems. FIG. 9 is for the extraction of uranium in the +4 valence state from phosphoric acid which is contained in the bulk phase. Extraction is through an organic external phase which contains carbon black. The external phase strips the extracted uranium from the bulk phase. The uranium passes to the internal phase, where uranium is oxidized to the uranium +6.

FIG. 10 illustrates an external phase stabilized by fumed silica. Uranium +6 is transferred from phosphoric acid to be reduced in the internal phase by a reductant (ferrous sulfate) to the +4 state.

The solids added, to be useful, must be capable of forming an emulsion of the internal phase in the external phase without loss of emulsion when transferred to a liquid bulk phase. To this end, amounts in the range of about 3 to about 30 grams per liter of the external phase have been employed. Particle size has ranged from 1 millimicron or less to 75 millimicrons or more. The amount and particle size will depend on the solid stabilizer selected.

The emulsion must, to some degree, be metastable since it is essential as part of the process to recover what becomes the internal phase from the external phase. This is accomplished by separation of the emulsion from the bulk phase and breaking of the emulsion.

Breaking of the emulsion may be by action of heat, centrifuge, ultrasound and the like. This enables the internal phase to be purified of the stripped species for reconstituting of the emulsion, as by agitation for reuse.

Because the emulsion in its functional form is somewhat metastable, exposure time to the bulk solution may be limited. This is depicted in FIG. 11, an extraction curve for recovery of uranium from phosphoric acid. The ordinate is uranium concentration in the bulk phase and the abscissa is time.

After a certain degree of extraction or loading of the internal phase, a reversal can normally be observed in which the uranium concentration in the bulk phase increases. The minimum point is the point at which extraction should be terminated to prevent backflow of the extracted species through the external phase and the emulsion separated and broken to remove extracted uranium from the internal phase to reconstitute the emulsion for reuse. Separation should occur at the minimum point of a predetermined extraction curve for a system. What is significant, however, is that the solid stabilizer for the emulsion is not lost by reaction or otherwise and the emulsion can be readily reconstituted for reuse.

For aqueous systems for which there is formed a water-in-oil emulsion, the organic phase will normally contain, in addition to the solids, an extractant selective for the species contained in the bulk phase.

For uranium, for instance, an extractant which may be contained in the external phase is a mixture of mono- and di-octylphenylphosphoric acids (OPAP). The extracted uranium +4 is drawn through the external phase into an internal phase or vice versa and oxidized by an oxidant such as hydrogen peroxide to the +6 valence state. Then the phase originally containing the oxidant will appear depleted in respect to uranium +4 to promote extraction of additional uranium +4 from the impure phase and its transmittal by the external phase to the provided stripping solution.

For extraction of uranium +6 and its reduction to uranium +4, the extractant which may be employed is the mixture of di-2-ethylhexylphosphoric acid and trioctylphosphine oxide (D2EHPA-TOPO or $D_2T$). A reductant for the internal phase may be ferrous sulfate.

Other impurities may be extracted by selective reagents. Di-tridecylamine, for instance, dissolved in a suitable organic solvent is functional for the extraction of vanadium, tungsten, and iron. Trilaurylamine is functional for the extraction of uranium and molybdenum. Tertiary amines containing from about 8 to about 10 carbon atoms in each attached hydrocarbon group are functional for the extraction of uranium, vanadium and chromium. Triisooctylamine is functional for the extraction of cobalt and uranium. Triisodecylamine is functional for the extraction of cobalt and uranium. Triisodecylamine is functional for the extraction of uranium and vanadium. Tri-tridecylamine is functional for the extraction of molybdenum, rhenium and uranium. The methyl ammonium chloride salt of tertiary amines containing from about 8 to about 10 carbon atoms in each hydrocarbon group attached to the nitrogen is functional for the extraction of vanadium, tungsten, chromium and uranium from neutral, as well as alkaline solutions. Oximes are functional for copper extractions. Dinonyl napthalene sulfonic acids are functional for extraction of a variety of metals from acids such as phosphoric acid.

Organics useful to form the external phase where the bulk and the internal phases are aqueous in nature are normally mineral oils, which can be paraffinic as solvent neutrals, naphthenic oils such as coastal pales, solvent extracted neutral oils, hydrorefined or hydrogenated oils and the like. The criteria for the organics forming the external phase is the ability to transmit, or dissolve transfer reagents for, the extracted impurities. Generally, the viscosity and viscosity index of the oil to be used are determined by the temperatures in the extraction system. The aromatics content of the oil is generally chosen to provide the needed solubility for the extractant or transfer reagent but should not be so great as to cause instability, if used in an oxidizing system.

Other applications for the solids stabilized extraction systems of the invention include the selected extraction of one or more hydrocarbons from one hydrocarbon phase into another hydrocarbon phase using an oil-in-water emulsion, such that the external phase is an aqueous phase. Other applications can involve the conversion of the extracted species into a precipitate or preferential separation or removal of organic compounds from aqueous phases, gases, enzymatic extractions and the like.

Other and more specific applications include separation of isomers of chlorotoluenes; removal of calcium and magnesium from brines to reduce hardness; removal of magnesium ions from wet process phosphoric acids; removal of sodium chloride from 10–30% caustic solutions; selective metal recovery from mixed metal solutions; extraction of copper or other metals from spent plating solutions; recovery of metal or cyanide from cyanide bearing nickel stripping solutions; recovery of nonnoble and noble metals from electrolytic plating and electroless plating solutions or from spent catalyst solutions; recovery of activator metals from spent solutions used in electroless plating and the like.

Many such applications are illustrated in more detail in the patents indentified in this application. In the instance of gas purification, the gas is the bulk phase which passes through an emulsion of the internal phase in the external phase wherein the external phase is selective to one or more constituents in the gas phase and where the solids are relied on as providing stability between the external and internal phases.

Extractions may be carried out in single cell or multi cell systems.

While no wise limiting, the following examples are illustrative of the invention with the controls providing comparisons to systems where a liquid surfactant is employed as the stabilizing agent.

EXAMPLES AND CONTROLS

Control A

Uranium was extracted from phosphoric acid using a liquid surfactant membrane. A water-in-oil emulsion was made by stirring an aqueous solution consisting of 6.8 ml of 85% $H_3PO_4$ and 2 ml of 30% $H_2O_2$ diluted to 20 ml with water (stripping phase) into 20 ml of an organic solution made by dissolving 6.57 g of mixed mono-and-dioctylphenylphosphoric acids (OPAP) in paraffin oil to make 100 ml and adding as the surfactant 1.7 g Span 80 TM (sorbitan monooleate). This mixture was stirred at about 1500 RPM for 10 minutes to emulsify the aqueous phase into the organic phase.

The emulsion this formed was stirred into 300 ml of 5 M $H_3PO_4$ containing 102 mg/l uranium in the +4 oxidation state and 7.02 g/l ferrous ammonium sulfate (bulk phase). The ferrous ammonium sulfate was added to prevent oxidation of the uranium to the +6 state. The emulsion was dispersed in the phosphoric acid by moderate stirring and the acid was sampled periodically and analyzed for uranium.

After 5 minutes, 14% of the uranium had been extracted and no more extraction occured. The experiment was stopped after 16 minutes as the emulsion had largely broken. After separation of the emulsion from the acid, the emulsion was was broken by centrifugation and only 1.51 ml of the aqueous phase was recovered. It appeared the emulsion became unstable during the separation by reaction between the peroxide and the surfactant.

Control B

To increase stability of the emulsion of Control A, another run was done in which all conditions were the same except that the amount of surfactant in the organic phase was doubled. In this run, it was found that 13.4% of the uranium was extracted from the acid (bulk phase) in 10 minutes but that thereafter the uranium concentration in the bulk phase increased and after 20 minutes, the extraction was only 6.2%. It appeared this was due to leaking back into the bulk phase. The emulsion was separated and broken by centrifugation. A total of 14.5 ml of the internal aqueous phase was recovered.

Analysis of the recovered aqueous solution showed that it contained 190 mg/l of uranium. It was concluded that while uranium was extracted from the bulk aqueous and concentrated in the internal aqueous phase of the emulsion, recovery was poor and the emulsion lacked stability and the ability to retain the extracted uranium.

EXAMPLE 1

A particulate solid rather than a surfactant was used to form and stabilize the emulsion. The organic phase of the emulsion consisted of a solution of 6.6 g OPAP dissolved in a paraffinic oil, Solvent Neutral 100 TM (Exxon) to make 100 ml of solution. To 15 ml of this solution was added 0.075 g fumed silica (Cab-O-Sil TM, grade M5, Cabot Corp.) This mixture was stirred at high speed for 3-4 minutes to disperse the solid, then 20 ml of 10 M $H_3PO_4$ containing 5 g/l $NaClO_3$ was added and the mixture was stirred for 10 minutes to form a stable emulsion. This emulsion was dispersed, with stirring, into 300 ml of 5 M $H_3PO_4$ containing 110 mg/l uranium (IV) and 1 g/l $FeSO_4.7H_2O$ (the bulk phase).

The bulk phase was sampled periodically and analyzed for uranium. The uranium concentration decreased progressively throughout the experiment. After 55 minutes, when the experiment was terminated, the bulk phase contained only 10 mg/l uranium, thus indicating that 91% of the uranium had been extracted from the solution.

The emulsion was separated from the bulk solution and broken by heating. The recovered internal aqueous phase was found to contain 550 mg/l uranium, a concentration five times that of the original bulk aqueous.

EXAMPLE 2

Example 1 was repeated except that the bulk aqueous solution contained 93 mg/l uranium. The results were similar, showing a progressive decrease in uranium concentration in the bulk phase with 88% of the uranium being extracted in 45 minutes. Upon breaking the emulsion it was found that the internal aqueous phase contained 790 mg/l of uranium, a concentration 8.5 times that of the initial bulk aqueous.

EXAMPLE 3

Example 2 was duplicated. Again, a progressive decrease in uranium was observed in the bulk phase. After 55 minutes 92% of the uranium had been extracted and the internal aqueous phase of the emulsion contained 1010 mg/l uranium, a concentration 10.9 times that of the initial bulk aqueous.

Control C

In this control uranium was extracted from phosphoric acid by a liquid surfactant membrane utilizing a different uranium carrier than that used in the previous controls. An emulsion was made in which the organic (external) phase consisted of a solution containing 64 g/l di-2-ethylhexylphosphoric acid (D2EHPA), 19 g/l trioctylphosphine oxide (TOPO) and 18 g/l sorbitan monooleate (Span 80 TM), all dissolved in paraffin oil. The D2EHPA-TOPO combination, referred to hereinafter as $D_2T$, is a known combination which is effective in the extraction of uranium (VI) from phosphoric acid.

To 20 ml of this oganic phase there was added as the stripping phase, with rapid stirring, 20 ml of 10 M phosphoric acid containing 50 g/l ferrous sulfate heptahydrate. This mixture was stirred for 10 minutes to form a stable emulsion.

The emulsion thus formed was dispersed, with moderate agitation, into 300 ml of 5 M phosphoric acid containing 100 mg/l uranium (VI) and 1 g/l sodium chlorate (bulk phase). The bulk phase was sampled periodically and analyzed for uranium.

Uranium concentration in the bulk phase decreased progressively until, after 30 minutes when the experiment was terminated, it had reached a concentration of 77 mg/l, indicating 23% extraction. The emulsion was separated from the bulk phase and broken by heating to approximately 80° C. The internal aqueous phase thus obtained was analyzed and found to contain 280 mg/l uranium, a concentration 2.8 times higher than was initially present in the bulk phase.

EXAMPLE 6

In this example, carbon black was used as a solid, non-surfactant emulsion stabilizer. The organic phase consisted of a solution of 67.0 g/l OPAP in Union 300 Neutral paraffinic oil. To 20 ml of this organic phase was added 0.2 g of carbon black (Vulcan XC-72R TM grade, Cabot Corp.) and the mixture was stirred at high speed for 10 minutes to disperse the solid into the liquid phase. Then 20 ml of 10 M phosphoric acid containing 50 g/l of sodium chlorate was added and the stirring was continued for an additional 10 minutes. The result was a stable water-in-oil type of emulsion. It had previously been found that an internal aqueous phase containing this high a concentration of sodium chlorate would rapidly destabilize an emulsion made with a liquid surfactant (Span 80).

The emulsion was dispersed in 5 M $H_3PO_4$ containing 100 mg/l uranium and 1 $FeSO_4.7H_2O$. The acid was maintained at a temperature of 40° C. Periodic sampling of the bulk phase showed a progressive decrease in uranium IV concentration and when the experiment was terminated after 10 minutes, the bulk aqueous contained only 38 mg/l uranium and the internal aqueous phase recovered after breaking the emulsion contained 790 g/l uranium. Thus, 62% of the uranium was extracted from the bulk aqueous phase and a concentration factor of 7.9 was achieved in the internal aqueous over the initial bulk aqueous.

EXAMPLE 7

This example was a duplicate of Example 6 except that the 20 ml of internal aqueous phase contained 5 g/l sodium chlorate, 15 ml of organic phase was used and 0.3 g of the carbon black was used to stabilized the emulsion. The bulk aqueous consisted of 300 ml of 5 M $H_3PO_4$ containing 97 mg/l uranium and 2 g/l $FeSO_4.7H_2O$. The emulsion was dispersed into the bulk aqueous, which was maintained at 40° C. and sampled periodically.

As in Example 6, the uranium was progressively extracted from the bulk phase and transferred into the internal aqueous phase. After 10 minutes, 81% of the uranium had been extracted from the bulk phase and the internal aqueous phase contained 1370 mg/l uranium, a concentration 13.7 times higher than that of the initial bulk aqueous.

This example and Example 6 established that high rates of uranium extraction and high concentration factors can be obtained with solid stabilized emulsions. Example 6 demonstrates that stable emulsions may be formed with solid stabilizers under conditions in which liquid surfactant-containing emulsions break rapidly.

EXAMPLE 8

This example illustrates a countercurrent two-stage extraction of uranium from phosphoric acid. All emulsions consist of an organic phase consisting of 66 g/l of OPAP dissolved in Union 300 Neutral TM oil and an aqueous phase consisting of 10 M $H_3PO_4$ containing 5 g/l $NaClO_3$. In each case 20 ml of organic phase and 20 ml of aqueous phase were used and the emulsions were stabilized by 0.20 g carbon black (Vulcan XC-72R, TM Cabot Corp.). The initial bulk aqueous was 300 ml of 5 M $H_3PO_4$ containing 100 mg/l uranium and 3.33 g/l $FeSO_4.7H_2O$.

A 40 ml quantity of emulsion (Unit A) was first dispersed in 300 ml of bulk aqueous (Unit B) for 10 minutes, then the emulsion and the bulk aqueous were separated. In this contact 85% of the uranium was extracted from the bulk aqueous (Unit B).

Unit A was then dispersed for 10 minutes with fresh bulk aqueous (Unit C). At this time, it was found that 26% of the uranium was extracted from Unit C and that the internal aqueous of the emulsion (Unit A) contained 1750 mg/l uranium, a concentration 17.5 times that of the initial bulk aqueous.

Bulk aqueous (Unit B) was next contacted with fresh emulsion (Unit D) for 10 minutes, at which time it contained only 3.0 mg/l uranium. Thus, 97% of the uranium was extracted from bulk aqueous (Unit B) in two contacts with fresh emulsion.

Excellent uranium extraction and a very high concentration factor are thereby demonstrated in a two stage countercurrent system.

EXAMPLE 9

This example illustrates the extraction and concentration of copper from aqueous solution by a particulate solid stabilized emulsion. The extractant used was LIX 64N TM, an oxime manufactured and sold by General Mills as a copper extractant. The organic phase consisted of a 10 wt.% solution of LIX 64N in a paraffinic oil which was 250 Solvent Neutral, manufactured and sold by Exxon Corp. The solid stabilizer was Bentone 38 TM, an organic derivative of a montmorillonite clay manufactured and sold by N. L. Industries. The internal aqueous phase consisted of 150 g/l sulfuric acid in water.

An emulsion was made by dispersing 0.2 g Bentone 38 TM in 20 ml of the organic phase by rapid stirring for 10 minutes and then adding 20 ml of the aqueous phase with continued stirring for an additional 10 minutes. The emulsion thus formed was dispersed into 300 ml of a copper sulfate solution containing 1.00 g/l copper, 16.67 g/l sodium acetate trihydrate and 10.0 g/l acetic acid. The copper solution (bulk aqueous) was sampled periodically and it was found that the copper concentration progressively decreased. After 75 minutes, the emulsion was separated from the bulk aqueous, which was found to contain 0.66 g/l of copper. Upon breaking the emulsion by heating and subjecting the emulsion to ultrasonic vibratory energy, an internal aqueous phase was recovered which was found to contain 5.60 g/l of copper. It is thus demonstrated that copper can be extracted from an aqueous solution and concentrated in a second aqueous solution by means of a solid stabilized emulsion. It is also demonstrated that an emulsion useful for such an extraction can be stabilized by a treated clay.

EXAMPLE 10

This example illustrates the extraction of metal ions from phospheric acid by a solid stabilized emulsion.

The organic phase of the emulsion was a solution of 17 g of dinonylnaphthalenesulfonic acid and 6.0 g D2EHPA in 60 g of Union 300 Neutral TM and 17 g of Coastal Extracted Mineral oil (Exxon). The internal aqueous phase was 150 g/l $H_2SO_4$ in water. An emulsion was made by dispersing 0.57 g Tullanox 500 TM, an organically modified fumed silica manufactured and sold by Tulco, Inc. into 51.9 g of the above organic solution by stirring at high speed for 10 minutes. At this time, 50.2 g of the above aqueous solution was added and stirring was continued for an additional 10 minutes to form a stable emulsion. The emulsion was dispersed into 200 ml of a commercial fertilizer grade of phosphoric acid (bulk aqueous phase) which was sampled periodically. After 45 minutes, the emulsion was separated from the bulk aqueous phase and broken by subjecting it to ultrasonic energy and centrifugation. The recovered internal aqueous phase was analyzed. Results of the analyses are given in Table 1.

TABLE 1

|  | MgO (g/l) | CaO (g/l) | U (mg/l) | $Fe_2O_3$ (g/l) | $Al_2O_3$ (g/l) |
|---|---|---|---|---|---|
| Bulk aqueous |  |  |  |  |  |
| initial | 4.51 | 0.631 | 56 | 10.1 | 10.7 |
| final | 3.81 | 0.463 | 47 | 8.49 | 8.29 |
| Internal aqueous | 4.06 | 0.497 | 37 | 7.13 | 7.77 |

These results show that metals can be extracted from phosphoric acid by solid stabilized emulsions and transferred into the internal aqueous phase of the emulsion.

It is also demonstrated that an emulsion useable for this purpose can be stabilized with an organically modified fumed silica.

EXAMPLE 11

In this example, uranium was extracted from commercial fertilizer-grade phosphoric acid (Mg removed by solvent extraction) by a solid stabilized emulsion containing $D_2T$ as the extractant. The organic phase of the emulsion consisted of 20 ml of a solution which contained 266.4 g/l D2EHPA and 76 G/l TOPO dissolved in Union Neutral 300 oil. The internal aqueous phase was a solution of 50 g/l ferrous sulfate heptahydrate in 10 M reagent grade phosphoric acid.

A 0.2 g quantity of fumed silica was dispersed in 20 ml of the organic phase and then 20 ml of the aqueous phase was added with rapid stirring to form a stable water-in-oil emulsion. The emulsion was dispersed into 300 ml of the fertilizer grade phosphoric acid to which had been added 0.2 g $NaClO_3$ at a temperature of 60° C. The phosphoric acid initially contained 57 mg/l of uranium.

After 60 minutes, the emulsion was separated from the bulk phase, which was now found to contain 17 mg/l uranium, showing that 70% of the uranium had been extracted from the acid. The internal aqueous phase was found to contain 300 mg/l of uranium, a concentration 5.3 times that initially present in the bulk phase.

EXAMPLE 12

Example 11 was repeated except that the bulk aqueous contained 0.2 g of ammonium persulfate instead of sodium chlorate and the extraction was carried out at 40° C. instead of 60° C. After contacting the emulsion with the bulk phase for 60 minutes, the concentration of uranium in the bulk phase had decreased to 42 mg/l from its initial value of 57 mg/l. It was thus demonstrated that 26% of the uranium had been extracted. Upon breaking the emulsion, 18 ml of internal aqueous phase was recovered which was found to contain 280 mg/l of uranium, thus demonstrating a concentration 4.9 times that initially present in the bulk phase.

EXAMPLE 13

A semi-continuous run was performed using OPAP as the extractant for uranium (IV) introduced as an impurity to synthetic phosphoric acid to a concentration of 100 mg/l. In the operation, the emulsion was prepared by continuously mixing the internal aqueous phase in the external organic phase with agitation and continous transfer of the formed emulsion to a stirred vessel to which the aqueous bulk phase was separately and continuously introduced. The emulsion and bulk phases were continuously withdrawn by liquid level overflow for analysis. Rates of feed of the aqueous bulk phase and the emulsion were adjusted to provide an average contact time of about 10 minutes. FIG. 12 illustrates the concentration factor (CF), namely, the ratio of concentration of extracted uranium to concentration of uranium in the bulk aqueous phase as a function of time of operation. FIG. 13 illustrates the percent of uranium extracted from the bulk phase and recovered from the internal phase also as a function of time of operation. The work established that uniform rates of extraction can be carried out with the operation.

Work in accordance with the invention has led to the observation that extraction can be best depicted as a second order kinetic equation having a rate constant $K_2$ expressed in 1/mg-min. For uranium extractions from phosphoric acids, rate constants from about $1.4 \times 10^{-4}$ to $45 \times 10^{-4}$ depending on the extractant employed and the degree of acid purity operated on. Some impurities, other factors being the same, tend to reduce the rate constant. Additional factors such as mechanical factors, complex formation and disassociation in the external phase, diffusion through the external phase and oxidation or reduction rates in the internal phase will also effect rate of extraction.

EXAMPLE 14

For the solid-stabilized emulsion extraction of chromium, an organic phase consisting of symmetrical, straight chain alkyl, saturated tertiary amine wherein the alkyl groups are a $C_8$–$C_{10}$ mixture with the $C_8$ chain predominating (Alamine 336 from General Mills) dissolved in paraffin oil was emulsified with an internal aqueous phase of 3.5 N NaOH. Carbon black (Sterling R-Cabot Corp.) acted as stabilizer. The bulk aqueous phase contained 5.3 g/l chromium added as $CrO_3$. Forty ml of emulsion (ratio organic/aqueous = 1) was dispersed in 300 ml of bulk aqueous. During the first five minutes 11% of the chromium was extracted. After 15 minutes the analysis of the bulk aqueous was the same as at 5 minutes and thereafter the extraction reversed. Addition of 5 ml concentrated HCl after 70 min. of stirring again reversed the trend and 28 minutes later 22% of the chromium had been extracted (probably as $HCrO_4^-$). Approximately 30 ml of emulsion was recovered, the internal aqueous phase of which was found to contain 16.83 g/l Cr.

It was thus demonstrated that chromium can be extracted from an aqueous solution by a solid stabilized emulsion and concentrated in the internal aqueous phase.

Similar results are obtained in this example when, instead of anionic chromium, the bulk aqueous phase comprises an anionic form of uranium, vanadium, tungsten, molybdenum, zirconium, hatnium, niobium, tantalum, lanthanum, or the rare earths, and where the internal aqueous phase contains a reagent which will convert the extracted, anionic form into another form which will not have a substantial outward migration.

What is claimed is:

1. An extraction process for transfer of at least one species from a fluid phase to a first liquid phase receptive to such species which comprises intimately contacting the fluid phase with an emulsion of the first liquid phase in a second particulate solids-containing liquid phase which is permeable with respect to such species and substantially immiscible in the first liquid phase and containing at least one substantially insoluble particulate solid which is substantially nonreactive to constituents contained in each of such phases and present in an amount sufficient to form a stable emulsion of the first liquid phase in the second particulate solids-containing liquid phase for a time sufficient for transfer of such species to the second particulate solids-containing liquid phase of such emulsion.

2. A process as claimed in claim 1 in which the transferred species is converted in the first liquid phase to a converted species, said second particulate solids-containing liquid phase being substantially impermeable to said converted species.

3. A process as claimed in claim 1 in which the fluid phase is a liquid phase immiscible in the second particulate solids-containing liquid phase.

4. A process for extraction of at least one species from a first liquid phase to a second liquid phase which comprises contacting the first liquid phase containing said species with a third particulate solids-containing liquid phase immiscible in the first and second liquid phases and containing at least one insoluble particulate solid substantially nonreactive with the constituents of such phases and present in a quantity sufficient to form a stable emulsion of the second liquid phase in the third solids-containing liquid phase, forming such stable emulsion of said second and said third liquid phases, said stable emulsion remaining stable for a time sufficient for such species to enter the third solids-containing liquid phase and diffuse to the second liquid phase.

5. A process as claimed in claim 4 in which the third particulate solids-containing liquid phase contains an extractant for the species.

6. A process as claimed in claim 4 in which the second liquid phase contains a reactant to convert the extracted species to a converted species, said third particulate solids-containing liquid phase being substantially impermeable to said converted species.

7. A process as claimed in claim 5 in which the second liquid phase contains a reactant to convert the extracted species to a converted species, said third particulate solids-containing liquid phase being substantially impermeable to said converted species.

8. A process for extraction of at least one species contained in a first liquid phase to a second liquid phase which comprises contacting the second liquid phase with an emulsion formed of the first liquid phase in a third particulate solids-containing liquid phase immiscible in the first and second liquid phases and containing at least one insoluble particulate solid which is substantially nonreactive with the constituents in each of such phases and present in a quantity sufficient to form a stable emulsion of the first liquid phase in the third particulate solids-containing liquid phase for a time sufficient for such species to enter the third solids-containing liquid phase and diffuse to the second liquid phase.

9. A process as claimed in claim 8 in which the third particulate solids-containing liquid phase contains an extractant for the species.

10. A process as claimed in claim 9 in which the second liquid phase contains a reactant to convert the extractant species to a converted species, said third particulate solids-containing liquid phase being substantially impermeable to said converted species.

11. A process as claimed in claim 9 in which the second liquid phase contains a reactant to convert the extractant species to a species which is substantially impermeable in the third particulate solids-containing liquid phase.

12. An extraction process which comprises:
(a) forming an emulsion of an internal aqueous phase in an external organic phase, said external organic phase containing an extractant selective to at least one species contained in an aqueous bulk phase and at least one insoluble particulate solid substantially nonreactive with respect to constituents of such phases, said insoluble particulate solid being present in an amount sufficient to form such emulsion of the internal aqueous phase in the external organic phase containing said particulate solids;
(b) combining the formed emulsion with the species-containing aqueous bulk phase for a time sufficient to enable extraction of the species by the extractant of the external solids-containing organic phase and transfer of the extracted species to the internal aqueous phase but insufficient time for transfer of the extracted species from the internal aqueous phase to the bulk aqueous phase.

13. A process as claimed in claim 12 in which the internal aqueous phase contains a reactant for converting the extracted species to a converted species said external solids-containing organic phase being substantially impermeable to said converted species.

14. An extraction process which comprises:
(a) forming an emulsion of an internal aqueous solution in an external immiscible organic phase, said internal phase containing at least one species to be extracted in said external immiscible organic phase, said external immiscible organic phase containing an extractant selective to such species and at least one insoluble particulate solid which is substantially nonreactive with respect to constituents in each of such phases, said insoluble particulate solid being present in an amount sufficient to form an emulsion of the internal aqueous phase containing said particulate solid;
(b) combining the formed emulsion with the species-containing aqueous bulk phase for a time sufficient to enable extraction of the species by the extractant of external solids-containing organic phase and transfer of the extracted species to the bulk aqueous phase but insufficient time for transfer of the extracted species from the bulk aqueous phase to the internal aqueous phase.

15. A process as claimed in claim 14 in which the external bulk phase contains a reactant for converting the extracted species to a converted species, said external solids-containing organic phase being substantially impermeable to said converted species.

* * * * *